United States Patent [19]

Tucker et al.

[11] 3,983,087

[45] Sept. 28, 1976

[54] NOVEL PROCESS OF RECLAIMING POLYURETHANE FOAM

[75] Inventors: Benjamin Tucker, Bethany; Henri Ulrich, Northford, both of Conn.

[73] Assignee: The Upjohn Company, Kalamazoo, Mich.

[22] Filed: July 25, 1975

[21] Appl. No.: 598,751

Related U.S. Application Data

[63] Continuation of Ser. No. 464,856, April 29, 1974, abandoned.

[52] U.S. Cl. .............................. 260/2.3; 260/2.5 AP; 260/77.5 A; 260/635 R
[51] Int. Cl.[2] ........................................... C08J 11/04
[58] Field of Search............ 260/2.3, 2.5 AP, 635 R

[56] References Cited
UNITED STATES PATENTS 3,632,530  1/1972  Kinoshita............................ 260/2.3
3,738,946  12/1973  Frulla et al. ......................... 260/2.3

*Primary Examiner*—Wilbert J. Briggs, Sr.
*Attorney, Agent, or Firm*—Denis A. Firth; John Kekich

[57] ABSTRACT

A process is described for converting scrap flexible polyurethane foam, derived from a polyether polyol, to a homogeneous mixture of polyols which can be used, alone or as a blend with other polyols, in the preparation of polyurethane foams. The process comprises heating the scrap foam with not more than its own weight of an aliphatic diol which has at least one alkyl substituent in the alkylene chain, and which optionally contains an oxygen atom in the alkylene chain. The scrap flexible foam can contain up to about 75 percent of scrap rigid or semi-flexible foam, if desired.

4 Claims, No Drawings

3,983,087

NOVEL PROCESS OF RECLAIMING POLYURETHANE FOAM

This is a continuation of application Ser. No. 464,856 filed Apr. 29, 1974 and now abandoned.

BACKGROUND OF THE INVENTION

1. Field of the Invention

This invention relates to the conversion of scrap polyurethane to useful polyols and is more particularly concerned with a process for the conversion of scrap flexible polyurethane foam, derived from a polyether polyol, to polyols which are reusable in the preparation of cellular polyurethanes.

2. Description of the Prior Art

The amount of scrap polyurethane foam which is being generated as trim, dust and the like from foam cutting operations, is a problem of increasing concern. The disposal thereof in solid waste form represents an environmental pollution problem as well as an economic one. The recovery and reuse of scrap rigid polyurethane foam has recently become possible through the process described in U.S. Pat. No. 3,738,946. The latter process involves heating the scrap foam with a mixture of aliphatic diol and a minor amount of dialkanolamine to produce a homogeneous polyol mixture capable of use, in its entirety, as a polyol component in the production of new polyurethane foam. The prior attempts to solve the problem of recovery of scrap foam are discussed in some detail in the above cited patent and will not be reviewed here.

Unfortunately the process of the above cited patent, which is entirely satisfactory for rigid foams, cannot be applied successfully to the recovery of the major class of flexible foams, namely, those derived from a polyether polyol. Thus, the process of the above patent, when employed with scrap from flexible, polyether-based foams, gives a product which separates into two layers, one of which is a polyol and the other appears to be a polyamine. The latter requires to be separated from the former and is not useful in the preparation of further polyurethane foams, although it has uses as a curing agent for epoxides and the like.

Substantially the same result is reported in U.S. Pat. No. 3,632,530 which describes the treatment of scrap flexible polyether-based polyurethane foam by heating in the presence of an aliphatic glycol and, optionally, a tertiary amine. The product separates into two layers one of which is polyol and the other is said to be polyamine. The latter is separated and shown to be useful as an amine curative for epoxy resins and for isocyanate-terminated prepolymers. As is evident from Example 9 of the above cited patent, there is no such problem with a polyester-based flexible foam. The latter gives rise to a homogeneous product which shows no tendency to separate into two layers.

Unfortunately, however, the bulk of the flexible foams currently produced commercially are derived from polyether polyols, and scrap from such foams has not so far been converted successfully to a homogeneous product which is usable in its entirety as a polyol component for the preparation of new polyurethane foam.

We have now found that, contrary to previously reported experience, it is possible, by careful choice of reactants, and of proportions thereof, and of reaction conditions, to convert scrap, polyether-based flexible polyurethane foam into a homogeneous mixture of polyols, which mixture does not separate into different components but can be used in its entirety as part, or the whole, of the polyol component employed in the preparation of new polyurethane foam.

SUMMARY OF THE INVENTION

The invention comprises a process of converting scrap flexible polyurethane foam, which has been derived from a polyether polyol, to a homogeneous mixture of polyols, which process comprises heating, at a temperature in the range of 180°C to 250°C, a mixture of (a) said scrap flexible polyurethane foam in comminuted form, and (b) an aliphatic diol having the formula HO—A—OH wherein A is selected from the class consisting of an alkylene radical from 2 to 6 carbon atoms, inclusive, and an alkylene radical from 2 to 6 carbon atoms wherein the chain thereof is interrupted by an oxygen atom, both of which alkylene radicals carry at least one lower-alkyl substituent on a carbon atom in the chain thereof, said diol being present in an amount by weight which does not exceed the total weight of said scrap foam.

The invention also comprises the polyol recovered in accordance with the above process.

The recovered polyol is useful, either alone or in admixture with virgin polyol, in the preparation of new polyurethane foam and, more particularly, in the preparation of new rigid polyurethane foam.

DETAILED DESCRIPTION OF THE INVENTION

The term "alkylene radical from 2 to 6 carbon atoms, inclusive" means $-(CH_2)_n-$ wherein n is an integer from 2 to 6, such as ethylene, propylene, butylene, pentylene, hexylene. The term "alkylene radical from 2 to 6 carbon atoms, inclusive, wherein the chain thereof is interrupted by an oxygen atom" means a radical of the formula $-(CH_2)_x-O-(CH_2)_y-$ wherein $x$ and $y$ are each integers and wherein the sum of $x + y$ is a whole number from 2 to 6.

The term "lower-alkyl" means alkyl from 1 to 6 carbon atoms, inclusive, such as methyl, ethyl, propyl, butyl, pentyl, hexyl and isomeric forms thereof.

It will be apparent from the above definitions that the aliphatic diols employed in the process of the invention are those in which the alkylene group separating the two hydroxyl groups must be branched, i.e. there is a lower-alkyl group present as a substituent on at least one of the carbon atoms of the alkylene chain. In addition to this alkyl substituent, there can, optionally, be an oxygen atom (i.e., an ether linkage) in the alkylene chain separating the two hydroxyl groups. Illustrative of aliphatic diols which meet the above requirements are 1,2-propylene glycol, 1,2-butanediol, 1,2-hexanediol, di(1,2-propylene glycol), di(1,2-butylene glycol), 3-methylpentane-1,5-diol, 2,2-dimethyl-1,3-propanediol, 1,2-octanediol, and mixtures of two or more of any of these diols.

It is to be noted that certain of the above glycols have been suggested previously as media in which to carry out the heat degradation of scrap flexible foam; see U.S. Pat. No. 3,632,530. However, the results reported in that patent with these diols, and a series of other closely related diols, always show the production of a product which separates into two layers, one of which constitutes polyol and the other amine. Although it is disclosed in general terms by the reference that proportions of scrap foam to glycol as high as equal amounts by weight can be employed, the actual examples all use amounts of glycol which are considerably in excess, by weight, of the amount of scrap foam.

In contrast, we have found that, in the case of certain glycols only, namely, those in which the alkylene chain separating the hydroxyl groups is branched, it is possible to obtain an entirely different result to that hitherto described, provided that the proportion of scrap foam introduced into the admixture with the glycol is markedly increased over the proportion hitherto employed in the art. Thus, by employing a glycol which meets the definition set forth above, and, further, by substantially increasing the proportion of scrap flexible polyether polyol-based foam to a minimum of at least an equal amount by weight based on glycol, and preferably in substantial excess of this amount, it has been found, very surprisingly, that it is possible to convert said scrap foam to a homogeneous mixture of polyols. That is to say, the product shows no tendency to separate into two layers, as in the case of the prior art, and shows no indication of the presence of amine therein. Further, the entire product, rather than a minor proportion thereof, can be used as the polyol component, or as a part thereof, in the preparation of virgin polyurethane foam.

As will be appreciated by one skilled in the art, this is a highly advantageous and clearly unexpected finding particularly in view of the concentrated search which has been made by the polyurethane foam industry in recent years to find a commercially feasible and economic manner in which to recover scrap from flexible foam.

In carrying out the process of the invention, the scrap flexible foam is advantageously chopped or ground to particles of relatively small size in order to reduce the volume of the scrap and to assist in reducing the time necessary for the reaction to take place. The scrap foam and the appropriate diol defined above are then brought together in a single operation, if desired, and the resulting mixture is heated to a temperature in the range of about 180°C to about 250°C, advantageously with agitation. Alternatively and preferably, the diol is heated to a temperature in the above range and the comminuted scrap foam is added thereto in increments with agitation.

As set forth above, the proportions in which the scrap foam and the aliphatic diol are employed in the process of the invention are such that the amount of scrap foam by weight is at least equal to the amount by weight of aliphatic diol. Preferably the scrap foam is employed in a proportion corresponding to from about 1.5 times to about 2 times the amount by weight of diol which is employed.

Once the admixture of scrap foam and aliphatic diol has been completed, preferably with agitation, the mixture is maintained at a temperature within the above range at least until all the scrap foam has dissolved and a homogeneous solution has been obtained. The end point of the reaction, namely, the point at which degradation of the scrap to a useful polyol has been completed, can be detected by routine techniques, for example, by infrared spectroscopic analysis, or by observing the rate of change of viscosity. In general, the period of heating necessary to recover the scrap foam as polyol will range from about 2 hours to about 12 hours depending upon the nature of the scrap polyurethane foam and diol which are employed. The most desirable reaction time for any particular combination of scrap foam and diol can be determined by a process of trial and error.

When the degradation of scrap foam is complete, as determined by routine analytical tests such as those described above, the reaction mixture is cooled, or allowed to cool, to room temperature. Depending upon the origin of the scrap foam it may be necessary to remove small quantities of particulate matter (e.g. fibers, non-polyurethane dust, laminate foil and the like) from the product by filtration or like techniques. Subject to the necessity for such treatment the product derived above is ready, without any further modification, for use as the polyol component in the preparation of new polyurethane foam.

The product generally has an hydroxyl equivalent weight in the range of about 65 to about 120 and is accordingly preferably used in the preparation of rigid polyurethane foams or for any other purpose, e.g. as a minor component in the preparation of polyisocyanurate foams, for which polyols having equivalent weights within this range are normally used. If desired, the polyol mixture obtained by the process of the invention can be blended with virgin polyol prior to conversion to polyurethane and the like foams.

Alternatively, the hydroxyl equivalent weight of the polyol mixture obtained by the process of the invention can be modified, i.e., increased, if desired, by reacting the recovered polyol with an alkylene oxide such as ethylene oxide, propylene oxide and the like. The alkoxylation can be carried out by processes well-recognized in the art optionally in the presence of a basic catalyst such as potassium hydroxide, sodium hydroxide, and the like.

It has also been found surprisingly that substantial amounts of scrap foam derived from semi-rigid (also sometimes known as semi-flexible) and/or rigid polyurethane or polyisocyanurate foams can be combined with the scrap flexible, polyether-based forms employed in the process of the invention without detracting from the overall result, i.e., the production of a homogeneous mixture of polyols suitable for re-use in the preparation of polyurethane and like foams. Thus, it has been found that quantities of scrap semi-rigid and/or rigid polyurethane or polyisocyanurate foam up to about 75 percent by weight, based on the scrap flexible polyether based foam, can be incorporated into the reaction mixture employed in the process of the invention. Preferably, the various types of scrap foam are pre-blended before being added to the aliphatic diol, but the different types of scrap foam can be added separately to the aliphatic diol if desired.

When the flexible foam is subjected to the process of the invention in combination with scrap from other types of foam as discussed above, it is necessary that the total amount of scrap be such that the proportion of total scrap foam to aliphatic diol be always within the limits discussed above.

It is pertinent to note that, where the scrap flexible foam is subjected to the process of the invention in combination with substantial quantities of scrap from the other sources described above, said scrap flexible foam can be present in the reaction mixture in an amount which represents less than an equal amount by weight compared to the aliphatic diol present in said reaction mixture. Yet, provided that the total weight of flexible and other types of scrap foam present in the reaction is still at least equal by weight to the amount of aliphatic diol present therein, the overall desired result will still be obtained, i.e., the reaction product will be a homogeneous mixture of polyols. This finding is clearly contrary to the result which would be achieved were the scrap flexible foam to be employed alone in the same proportion by weight.

The viscosity of the reaction product obtained in accordance with the process of the invention is largely governed by the particular diol and scrap foam used and by the proportions in which they are used in the range set forth above. Advantageously, the viscosity of the reaction product is within the range of about 300 centistokes to about 4,500 centistokes measured at 25°C. A viscosity in this range can be attained readily in the case of any particular diol and scrap polyurethane by a process of trial and error.

While any of the branched chain aliphatic diols falling within the definitions given above can be used in the process of the invention, a particularly preferred diol is 1,2-propylene glycol. It is to be noted in this regard that closely related aliphatic diols such as ethylene glycol, diethylene glycol and butane-1,4-diol, which differ only from the diols employed in the process of the invention by the absence of branching in the alkylene chain, do not give rise to a homogeneous mixture of polyols when employed under exactly the same conditions. Thus, the straight chain aliphatic diols such as those enumerated above, when heated with scrap flexible polyether-based foam at the temperatures and in the proportions corresponding to those employed in the process of the invention, give rise to products which separate into two layers of different character, in contrast to the homogeneous mixtures obtained in accordance with the invention.

As will be obvious to one skilled in the art, the process of the invention can, if desired, be operated on a continuous basis. For example, the scrap foam and the aliphatic diol can be fed in separate streams, or after preblending if desired, to a continuous tube reactor in which the reactants are agitated and subjected to a temperature within the range set forth above. The residence time, or hold up time, in the reactor is adjusted so that the conversion to homogeneous polyol is effected in a single pass through the reactor. Alternatively, the reaction mixture can be continuously recycled through the reactor a plurality of times until the total residence time in the reactor is such as to accomplish the desired conversion. In a further alternative mode of operation on a continuous basis, the preliminary step of comminuting the scrap foam can be omitted and the scrap foam can be fed to a continuous reactor which is provided with means for crushing or comminuting the scrap foam in contact with the aliphatic diol preferably at a temperature within the range set forth above. Other modes of operation on a continuous basis will be readily apparent to one skilled in the art.

The following examples describe the manner and process of making and using the invention and set forth the best mode contemplated by the inventors of carrying out the invention but are not to be construed as limiting.

EXAMPLE 1

The scrap foam employed as starting material in the process described in this Example was obtained from a flexible foam which had been prepared using the following reactants in the proportions (parts by weight) set forth below.

| | | |
|---|---|---|
| Toluene diisocyanate (80/20) | 49 | parts |
| Propoxylated glycerol (eq. wt. = 1000; LG-56, Union Carbide) | 100 | parts |
| Stannous octoate | 0.22 | part |
| N-ethylmorpholine | 0.25 | part |
| Triethylenediamine | 0.3 | part |
| Surfactant (L-520) | 1.0 | parts |
| Water | 4.0 | parts |

The foam was prepared by thoroughly admixing all the components except the isocyanate and then adding the latter to the preblend of the other components and subjecting the resulting mixture to high speed mechanical stirring for 10 seconds. The resulting foam was cured at 25°C for 7 days.

A batch (25 g.) of scrap from the above foam was comminuted in a Wiley laboratory mill and added in increments, over a period of 2 hours and 50 minutes, to 25 g. of 1,2-propylene glycol maintained at 200°C to 225°C with stirring. After the addition was complete, the mixture was heated with agitation for a further 6 hours (approx.) until a clear homogeneous solution was obtained. The resulting product was allowed to cool to room temperature (circa 20°C) and was found to remain a homogeneous liquid even after standing for several weeks. The product (48 g.) was dark brown and mobile, and had a viscosity of 407 centistokes at 20°C and a hydroxyl equivalent weight of 81:5.

EXAMPLE 2

A second batch of 40 g. of scrap from the flexible foam described in Example 1 as comminuted and added in increments over a period of 4 hours and 25 minutes to 25 g. of propylene glycol maintained at 200° to 234°C with agitation. When the addition was complete, the mixture was maintained for a further 6.5 hours within the same temperature range with agitation. At the end of this time, the mixture was allowed to cool to room temperature (20°C) to yield 60.6 g. of a brown homogeneous mobile liquid which had a viscosity of 607 centistokes at 20°C and a hydroxyl equivalent weight of 101.

EXAMPLE 3

This example illustrates the different result obtained using an aliphatic glycol other than those called for by the process of the invention.

The experiment described in Example 2 was repeated exactly as described, but the 1,2-propylene glycol was replaced by an equal weight of ethylene glycol. The product so obtained separated into two layers on being allowed to cool to room temperature.

EXAMPLE 4

This example demonstrates the effect of using the aliphatic diol in an amount greater than the amount by weight of scrap foam.

A batch (23 g.) of comminuted scrap from the flexible foam described in Example 1 was added incrementally, over a period of 1 hour, to 48.7 g. of 1,2-propylene glycol maintained at 200° – 230°C with agitation. The resulting mixture was maintained at a temperature within the above range for a further 8 hours with agitation and was then allowed to cool to room temperature (circa 20°C). After standing at the latter temperature for a very short period the initially homogeneous product separated into two layers.

EXAMPLE 5

A further batch (20 g.) of comminuted scrap from the flexible foam described in Example 1 was added incrementally, over a period of 3 hours and 25 minutes, to 20 g. of 1,2-butanediol maintained at 200° to 223°C with agitation. After the addition was complete, the mixture was maintained at a temperature in the above range with agitation for a further 3.5 hours and was then allowed to cool to room temperature (20°C). The product so obtained (39 g.) was a brown mobile liquid which was homogeneous and showed no tendency to separate into two layers on standing. The product had a viscosity of 396 centistokes at 20°C and a hydroxyl equivalent weight of 91.

EXAMPLE 6

A further batch (20 g.) of comminuted scrap from the flexible foam described in Example 1 was added incrementally, over a period of 2 hours, to 20 g. of 3-methylpentane-1,5-diol maintained at 200° to 228°C with agitation. The resulting mixture was maintained at a temperature in the above range for a further 5 hours with agitation before being allowed to cool to room temperature (20°C). The resulting brown liquid (39.2 g.) showed no tendency to separate into two layers even after allowing to stand for several weeks. The product had a viscosity of 2018 centistokes at 20°C and an hydroxyl equivalent weight of 120.

EXAMPLE 7

The scrap employed in this example was taken from a commercially available polyether-based flexible foam (2 pcf density) in the form of bunstock sold by the CPR Division of The Upjohn Company as flexible foam "CPR 9700-2.0 WFR."

An aliquot of 50 g. of scrap from the above foam was comminuted and then added incrementally, over a period of 3 hours, to 25 g. of 1,2-propylene glycol maintained at 200° to 234°C with agitation. The resulting mixture was maintained at a temperature in the above range for a period of a further 5 hours with agitation and then was allowed to cool to room temperature (20°C). The resulting brown liquid (70.5 g.) was homogeneous and showed no tendency to separate even upon standing for several weeks. The product had a viscosity of 1271 centistokes at 20°C and an hydroxyl equivalent weight of 98.5.

EXAMPLE 8

A mixture was prepared of 20 g. of comminuted scrap flexible foam from the commercially available flexible foam described in Example 7 and 20 g. of comminuted scrap from a semi-flexible foam prepared using the following reactants in the proportions (all parts by weight) set forth below:

| | | |
|---|---|---|
| Polymethylene polyphenyl polyisocyanate[1] | : | 64.2 parts |
| Polyether (propoxylated trimethylolpropane eq. wt. = 2000) | : | 100 parts |
| Aromatic based polyol[2] | : | 10 parts |
| N,N',N''-tris(dimethylaminopropyl)hexa-hydrotriazine [50% w/w solution in aromatic based polyol[2]] | : | 0.7 part |
| Triethanolamine | : | 4 parts |
| Water | : | 2 parts |
| Dibutyltin dilaurate | : | 0.5 part |
| Trichlorofluoromethane | : | 10 parts |

[1]Containing approximately 68% methylenebis(phenyl isocyanate) and having eq. wt. = 133.
[2]Blend of N,N-di(2-hydroxypropyl)aniline and Mannich base polyol derived from nonylphenol, diethano)-amine and formaldehyde capped with propylene oxide; eq. wt. = 104.5.

The foam was prepared by thoroughly admixing all the components except the isocyanate and then adding the latter to the preblend of the other components and subjecting the resulting mixture to high speed mechanical stirring for 10 seconds. The resulting foam was cured at 25°C for 7 days.

The mixture of scrap foams was added in increments, with stirring, over a period of 2 hours and 15 minutes to 25 g. of 1,2-propylene glycol maintained at 200 to 230°C. When the addition of scrap was complete, the mixture was maintained at the above temperature with stirring for a further 5.5 hrs. and then allowed to cool to room temperature (circa 20°C). There was thus obtained 60.9 g. of a mobile homogeneous mixture of polyols having a viscosity of 1042 centistokes at 20°C and an hydroxyl equivalent weight of 91.

EXAMPLE 9

A mixture was prepared by blending 40 g. of comminuted scrap flexible foam from the commercially available flexible foam described in Example 7 and 20 g. of scrap from a rigid polyurethane foam which had been prepared using the following reactants in the proportions (all parts by weight) set forth below:

1. A blend of the following polyols:
   60 parts of a blend (eq. wt = 151) of (i) a polyol obtained by propoxylating a polymethylene polyphenyl polyamine containing approximately 50 percent by weight of methylenedianiline and (ii) a polyol of eq. wt = 89 obtained by propoxylating glycerol;
   30 parts of an adduct of phosphoric acid and propylene oxide having an equivalent weight of 148;
   10 parts of trimethylolpropane.
2. 2 parts of organosilicone surfactant (L-5410)
3. 0.4 part of water
4. 0.6 part of tetramethylguanidine
5. 0.4 part of N,N,N',N'-tetramethylbutanediamine
6. 33 parts of trichlorofluoromethane
7. 140 parts of polymethylene polyphenyl polyisocyanate of equivalent weight 134.

Ingredients (1) to (6) were blended by mechanical mixing and the polyisocyanate (7) was added to the blend. The resulting mixture was subjected to high speed mechanical stirring for 10 seconds and then was allowed to foam freely. The foam so obtained, after being cured for 7 days at circa 15°C, was found to have a density of 2.03 pcf and a compressive strength of 48.5 psi parallel to rise and 17.3 psi perpendicular to rise.

The mixture of scrap foams was added in increments, with stirring, over a period of 3 hours to 25 g. of propylene glycol maintained at 200°C to 228°C with agitation. After the addition was complete, the mixture was maintained for a further 5 hours and 15 minutes at the same temperature with stirring, and was then allowed to cool to room temperature (circa 20°C). There was thus obtained 80.5 g. of a mobile, homogeneous mixture of polyols having a viscosity of 4214 centistokes at 20°C and an hydroxyl equivalent weight of 92.5.

EXAMPLE 10

A total of 3000 g. of scrap from the commercially available flexible foam described in Example 7 was comminuted and added in increments, over a period of 5 hours, to 1500 g. of 1,2-propylene glycol maintained at 180° to 195°C with agitation in an 18 liter reactor. When the addition was complete the mixture was maintained within the same temperature range with stirring for an additional hour. Thereafter an additional 865 g. of 1,2-propylene glycol were added and the mixture was heated for an additional 2 hours at 190°C with stirring. The resulting product was allowed to cool to room temperature (circa 20°C). There was thus obtained 4832 g. of a mobile, homogeneous mixture of polyols having an hydroxyl equivalent weight of 68.

A rigid foam was prepared by blending 50 parts by weight of the mixture of polyols obtained as described above with 50 parts by weight of a polyol of equivalent weight 151 which itself was a blend of (i) a polyol obtained by propoxylating a polymethylene polyphenyl polyamine containing approximately 50 percent by weight of methylenedianiline and (ii) a polyol of equivalent weight 89 obtained by propoxylating glycerol.

The polyol mixture so obtained was blended with 2 parts by weight of triethylenediamine, 2 parts by weight of organosilicone surfactant and 42 parts by weight of trichlorofluoromethane, and to the resulting mixture was added 175 parts of polymethylene polyphenyl polyisocyanate (equivalent weight 133). The mixture so obtained was subjected to high speed mechanical stirring for 10 seconds and then allowed to foam freely.

The foam which resulted was cured for 3 days at 20°C and found to have the following properties:

| | |
|---|---|
| Density | 1.96 pcf |
| Compressive strength: | |
| Perpendicular to rise: | 18.1 psi |

We claim:
1. A process for converting scrap flexible polyurethane foam, which foam has been derived from a polyether polyol, to a homogeneous mixture of polyols, which process comprises heating, at a temperature in the range of 180°C to 250°C, a mixture of (a) said scrap flexible foam and (b) 1,2-propylene glycol said glycol being present in an amount by weight which does not exceed the total weight of said scrap foam.
2. The process of claim 1 wherein the said scrap flexible foam is employed in an amount by weight corresponding to from about 1 to about 2 times the amount by weight of said glycol.
3. The process of claim 1 wherein the said scrap flexible foam is employed in combination with scrap from a foam selected from the class consisting of semi-rigid polyurethane foam, rigid polyurethane foam, and rigid polyisocyanurate foam.
4. The process of claim 1 wherein the homogeneous polyol recovered from said scrap foam is reacted with an alkylene oxide selected from the group consisting of ethylene oxide and propylene oxide.

* * * * *